Jan. 18, 1944.    C. I. BAKER    2,339,369
DEAERATING APPARATUS
Filed Nov. 1, 1941
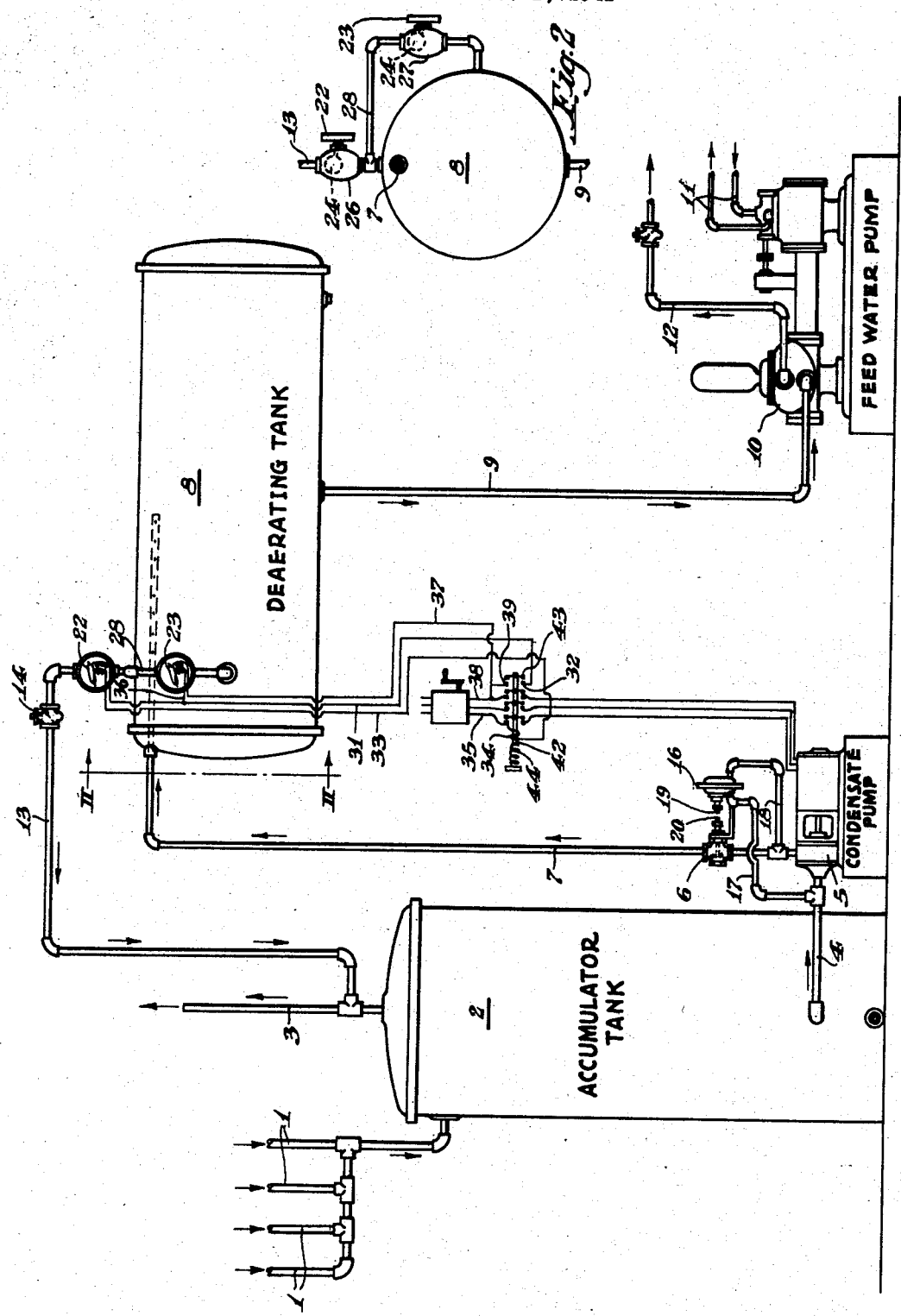
INVENTOR.
Charles I. Baker
BY Brown, Critchlow & Flick
his ATTORNEYS.

Patented Jan. 18, 1944

2,339,369

UNITED STATES PATENT OFFICE 2,339,369

DEAERATING APPARATUS

Charles I. Baker, West Hickory, Pa.

Application November 1, 1941, Serial No. 417,519

12 Claims. (Cl. 183—2.5)

This invention relates to apparatus for deaerating water circulating in steam heating systems and the like.

In such systems the greatest corrosion is in the condensate return and feed water piping. Corrosive gases are evolved with the steam from the boiler water, these being oxygen and carbon dioxide. When the steam condenses, it becomes distilled water, and as the temperature of the condensate decreases its capacity to dissolve gases increases and it becomes carbonic acid condensate which is corrosive. If oxygen is dissolved also, the acid condensate becomes regenerative and severe corrosion results. Oxygen is consumed in corrosion so that more oxygen must be made available for severe corrosion to continue. Unless some means is provided for eliminating additional oxygen the severe corrosion action becomes continuous. Oxygen enters the system as air leakage in the vacuum return line, as dissolved oxygen in make-up water, and may be dissolved from the air in open receivers. The oxygen made available for boiler corrosion must enter with the feed water.

The capacity of condensate to dissolve oxygen increases with increase of the pressure or decrease in temperature or both. Therefore, to release oxygen from the condensate it is only necessary to reverse these actions; that is, to reduce the pressure or increase the temperature, or both. This causes the condensate to reach a boiling point which is the zero concentration of gases or the zero capacity of condensate to hold oxygen in solution, and the dissolved oxygen is set free. Deaeration is the process of developing this condition of zero concentration of gases and separating the freed gases from the condensate. Thus, to deaerate condensate of its dissolved oxygen it is only necessary to develop a condition of pressure and temperature which will produce a boiling point and then separate and remove the freed gases. For example, if the condensate is returned at 140° F. and atmospheric pressure the pressure may be reduced to 24 inches of vacuum or the temperature may be raised to 212° F. to develop a boiling point or zero concentration of gases. Dissolved gases are set free in the form of quantities of minute bubbles which quickly separate by flotation. Vacuum, by increasing the size of the bubbles, assists flotation and shortens the time of separation.

In the usual deaerating process the condensate returning at 140° F. is reheated to the boiling point corresponding to the pressure within the deaerator and the condensate flashed into steam for the separation of the gases. This steam then is passed over cool water tubes for recondensing. The corrosive gases, being non-condensable, are discharged to the atmosphere.

It is among the objects of this invention to provide deaerating apparatus which does not require resteaming and recondensing of the condensate, which is simple and inexpensive in construction and operation, but highly efficient, and by which the gases are separated from the condensate by flotation and then discharged to the atmosphere.

In accordance with this invention a deaerating tank is placed between a receiver or accumulator tank and the feed water pump of a boiler. The accumulator collects condensate returning to the boiler and is connected to the deaerating tank by means of a normally closed inlet pipe. The deaerating tank is provided with an outlet for gases in which there is a check valve. A feed water pump delivers condensate from the deaerating tank to the boiler, and when the inlet and check valves are closed, as they are most of the time, a vacuum is created in the deaerating tank so that gases are readily freed from the condensate therein. As soon as the condensate in the deaerating tank reaches a predetermined low level the tank is automatically refilled quickly with condensate from the accumulator. This condensate is delivered through the normally closed inlet pipe which is opened at that time. The entering condensate raises the level of the liquid remaining in the deaerating tank, so the gases that have been freed are forced out of the tank through its gas outlet.

The preferred embodiment of the invention is illustrated in the accompanying drawing in which Fig. 1 is a somewhat diagrammatic side view of my deaerating apparatus; and Fig. 2 is an end view of the deaerating tank taken on line II—II of Fig. 1.

Referring to Fig. 1 of the drawing, condensate returning from boiler steam through pipes 1 enters the upper portion of an accumulator tank 2 the top of which is provided with a vent pipe 3. The lower portion of the tank is connected by a pipe 4 to an electrically operated condensate pump 5. The outlet of the pump is connected through a valve 6 and pipe 7 to the inlet of a deaerating tank 8 disposed in a horizontal position. Inlet pipe 7 is connected to one end of the tank near its top and extends into the tank where it is perforated to form a spray. The bottom of the deaerating tank is connected by a pipe 9 to a feed water pump 10 below it operated by steam circulating through pipes 11. The outlet of the pump is connected by a pipe 12 to the inlet of a boiler (not shown). The top of the deaerating tank is connected by a pipe 13 containing a check valve 14 either directly to the atmosphere or to the vent pipe 3 of the accumulator tank.

The valve 6 in the deaerating tank inlet pipe 7 is spring seated and of such construction that the atmospheric pressure on the condensate in the accumulator tank tends to keep it seated so that pipe 7 normally is closed. However, the valve is provided with a diaphragm unit 16 having the valve side of its diaphragm connected by a pipe 17 to inlet pipe 4 of pump 5, and the opposite side of the diaphragm connected by a pipe 18 to the outlet side of the pump. The pressures in the two halves of the diaphragm unit are therefore normally balanced. When the condensate pump is started in operation the pressure that it creates in pipe 18 causes a horizontally movable pin 19 to be pressed against the protruding valve stem 20 and thus opens that valve for the passage of condensate into the deaerating tank.

The operation of condensate pump 5 by which the deaerating tank is refilled at intervals is most suitably controlled by float switches 22 and 23 actuated by the rise and fall of the condensate in the deaerating tank. Preferably, each switch is a mercury type actuated by a float 24 housed in a float chamber in which the condensate can rise and fall. As shown in Fig. 2, one float chamber 26 may be connected in the gas outlet pipe 13 of the deaerating tank for actuation by the condensate after the tank is full, and the other float chamber 27 may be located beside the tank in a side arm pipe 28 connected to the tank and pipe 13. The lower float switch is actuated by the condensate when it reaches a predetermined low level.

These two switches are so connected for operating the condensate pump that both must be closed before the pump will start operating and both must be open in order to stop the pump. A convenient way of accomplishing this is to cause these switches to operate a magnetic relay switch in the power circuit for the pump. Thus, the upper switch 22 is connected by a wire 31 to a switch contact 32 and by a wire 33 to a solenoid coil 34 which is connected to one line 35 of a three-phase power circuit. The lower switch 23 is connected by a wire 36 to wire 31, and by a wire 37 directly to another line 38 of the three-phase circuit and to a contact 39 of the relay. When the upper float switch is closed nothing happens, but when the lower float switch likewise closes a circuit is completed through the two switches and the solenoid coil. The energized coil draws switch bar 42 to the left. This bar carries four pairs of contacts, three pairs of which close the three lines of the power circuit so that pump 5 can start operating. The fourth pair of contacts 43 engage contacts 32 and 39, thereby shunting the lower switch so that when the lower float switch is again opened the circuit through solenoid coil 34 is preserved until the upper switch is opened, whereupon bar 42 is moved to the right by a spring 44 to open the relay and the circuit to the condensate pump.

In operation feed water pump 10 slowly and constantly withdraws condensate from the bottom of deaerating tank 8 while condensate is continuously returning to accumulator tank 2. As check valve 14 in the gas outlet pipe and inlet valve 6 in the inlet pipe of the deaerating tank normally are closed, the lowering of the condensate level in that tank reduces the pressure therein to a vacuum boiling point corresponding to the temperature of the condensate. Further withdrawal of condensate causes some of it to flash into steam to maintain that particular vacuum. This quick reduction of the pressure within the deaerating tank to the boiling point, according to the temperature of the condensate therein, which is the zero concentration of gases, sets free the dissolved gas within the condensate. These rise by flotation to the surface and escape to the space in the tank above the condensate. As the deaerating tank is horizontal, the gases can quickly rise to the surface of the condensate because the distance to be traveled by them is short.

As soon as condensate starts to be withdrawn from the deaerating tank by the feed water pump, the upper float switch 22 is closed, but, as previously explained, the operating circuit for the condensate pump relay can not be completed until float switch 23 likewise is closed. This does not happen until the condensate reaches a compensating low level within the deaerating tank. The condensate pump quickly refills the deaerating tank through pipe 7 so that the condensate in the tank can be held as long as possible under the highest vacuum. This is important because the important deaerating time is between the end of a refilling and the beginning of the next refilling. The longer the time between refillings, the greater the opportunity for escape of the gases from the condensate. While the condensate is entering the deaerating tank through its inlet, the spray tube in the tank causes the entering condensate to spray out and thus condense any steam vapors. This helps to maintain the vacuum in the deaerating tank while the condensate level is rising therein. As the condensate rises in the deaerating tank the non-condensable gases which have freed themselves from the condensate are forced by it out of the tank to the atmosphere through pipe 13 and valve 14. As soon as the tank is refilled and both float switches have opened, the circuit to the condensate pump is opened and it stops operating. Valve 6 closes immediately, and a vacuum is recreated in the deaerating tank at once by the withdrawal of the condensate therefrom by feed water pump 10. This cycle is repeated as long as the steam heating system is in operation.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A boiler feed water deaerator comprising an accumulator tank for collecting condensate from boiler steam, a deaerating tank provided with an outlet for gases and with a normally closed condensate inlet communicating with the lower portion of the accumulator tank, a check valve in said outlet, a feed water pump for pumping condensate from the deaerating tank to a boiler whereby a vacuum is created in the deaerating tank and gases are freed from the condensate therein, means for periodically delivering condensate from the accumulator to the deaerating tank through said inlet whereby the gases in the deaerating tank are forced out through said outlet, and means floating on the condensate in the deaerating tank and operatively connected to said delivering means for controlling the operation of the latter in accordance with the level of the condensate in the deaerating tank.

2. A boiler feed water deaerator comprising an accumulator tank for collecting condensate from boiler steam, a deaerating tank provided with an outlet for gases and with a normally closed condensate inlet communicating with the accumulator tank, a check valve in said outlet, a feed water pump for pumping condensate from the deaerating tank to a boiler whereby a vacuum is created in the deaerating tank and gases are freed from the condensate therein, a condensate pump for periodically delivering condensate from the accumulator to the deaerating tank through said inlet whereby the gases in the deaerating tank are forced out through said outlet, means actuated by the condensate in the deaerating tank when it reaches a predetermined low level for starting said condensate pump, and means actuated by the condensate in the deaerating tank when it reaches a predetermined high level for stopping said condensate pump.

3. A boiler feed water deaerator comprising an accumulator tank for collecting condensate from boiler steam, a deaerating tank provided with an outlet for gases and with a normally closed condensate inlet communicating with the accumulator tank, a check valve in said outlet, a feed water pump for pumping condensate from the deaerating tank to a boiler whereby a vacuum is created in the deaerating tank and gases are freed from the condensate therein, a condensate pump for periodically delivering condensate from the accumulator to the deaerating tank through said inlet whereby the gases in the deaerating tank are forced out through said outlet, a float switch actuated by the condensate in the deaerating tank when it reaches a predetermined low level for starting said condensate pump, and a float switch actuated by the condensate in the deaerating tank when it reaches a predetermined high level for stopping said condensate pump.

4. A boiler feed water deaerator comprising an accumulator tank for collecting condensate from boiler steam, a deaerating tank provided with an outlet for gases and with a normally closed condensate inlet communicating with the accumulator tank, a check valve in said outlet, a feed water pump for pumping condensate from the deaerating tank to a boiler whereby a vacuum is created in the deaerating tank and gases are freed from the condensate therein, means for periodically delivering condensate from the accumulator to the deaerating tank through said inlet whereby the gases in the deaerating tank are forced out through said outlet, the pressure of the condensate being delivered to the deaerating tank causing said inlet to open, and means actuated by the condensate in the deaerating tank when it reaches a predetermined low level for starting said delivering means in operation.

5. A boiler feed water deaerator comprising an accumulator tank for collecting condensate from boiler steam, a deaerating tank provided with an outlet for gases and with an inlet communicating with the accumulator tank, a normally closed valve in said inlet, a check valve in said outlet, a feed water pump for pumping condensate from the deaerating tank to a boiler whereby a vacuum is created in the deaerating tank and gases are freed from the condensate therein, a condensate pump for periodically pumping condensate from the accumulator to the deaerating tank through said inlet, and means operably connecting said condensate pump to said inlet valve whereby the pump pressure opens that valve whenever the pump is operating.

6. A boiler feed water deaerator comprising an accumulator tank for collecting condensate from boiler steam, a deaerating tank provided with an outlet for gases and with an inlet communicating with the accumulator tank, a normally closed valve in said inlet, a check valve in said outlet, a feed water pump for pumping condensate from the deaerating tank to a boiler whereby a vacuum is created in the deaerating tank and gases are freed from the condensate therein, a condensate pump for periodically pumping condensate from the accumulator to the deaerating tank through said inlet, a high level float switch and a low level float switch associated with the deaerating tank for actuation by the condensate therein, electric circuits connecting said switches with said condensate pump, and a plurality of electric switches in said circuit actuated by said float switches when they are both closed for starting said condensate pump and for maintaining that pump in operation until the high level float switch is opened.

7. A boiler feed water deaerator comprising an accumulator tank for collecting condensate from boiler steam, a deaerating tank provided with an outlet for gases, a check valve in said outlet, a pump having an inlet connected to the lower portion of the accumulator tank and an outlet connected to the upper portion of the deaerating tank, a normally closed pressure-operated valve in said pump outlet adapted to be opened by the pressure created by the pump, a feed water pump for pumping condensate from the deaerating tank to a boiler, an electric relay operatively connected to said pump, two float-operated electric switches disposed in vertically spaced relation and responsive to the level of the condensate in and above the deaerating tank, and wiring so connecting said switches to said relay that both switches must be closed to start the pump and both must be open to stop the pump.

8. A boiler feed water deaerator comprising an accumulator tank for collecting condensate from boiler steam, a deaerating tank provided with an outlet for gases, a check valve in said outlet, a pump having an inlet connected to the lower portion of the accumulator tank and an outlet connected to the upper portion of the deaerating tank, a normally closed pressure-operated valve in said pump outlet adapted to be opened by the pressure created by the pump, a feed water pump for pumping condensate from the deaerating tank to a boiler, and electric switches actuated by changes in the level of the condensate for starting and stopping the operation of said condensate pump.

9. A boiler feed water deaerator comprising an accumulator tank for collecting condensate from boiler steam, said tank having a top outlet to atmosphere, a deaerator tank provided with a top outlet for gases, a check valve in said outlet, a pump having an inlet connected to the lower portion of the accumulator tank and an outlet connected to the upper portion of the deaerator tank, a spring-closed valve in said pump outlet provided with a diaphragm adapted to be operated by the inlet and outlet pressures of the pump to open the valve, a feed water pump for pumping condensate from the deaerating tank whereby a partial vacuum is created in the tank and gases are freed from the condensate therein, and float-operated electric means responsive to the condensate at two different levels in the deaerator tank for starting and stopping said first-mentioned pump.

10. A boiler feed water deaerator comprising an accumulator tank for collecting condensate from boiler steam, the top of said tank being provided with a vent to the atmosphere, a deaerating tank for holding condensate under vacuum to free it of dissolved and entrained gases, the top of said deaerating tank having a vent to the atmosphere, a check valve in said last-mentioned vent to prevent the entrance of air, a feed water pump for withdrawing condensate from the deaerating tank whereby a vacuum is created in the tank, a condensate pump and piping for refilling the deaerating tank from the accumulator tank, a spring seated valve in the outlet pipe of the condensate pump adapted to close with the flow, a diaphragm unit responsive to water pressure created by operation of the condensate pump for opening said spring seated valve, a float switch actuated by the condensate at a predetermined level for starting the condensate pump, a float switch actuated by the condensate at a different level for stopping the condensate pump, and electric wiring for connecting the condensate pump and switches to a source of electric power.

11. A boiler feed water deaerator comprising an accumulator tank for collecting condensate from boiler steam, the top of said tank being provided with a vent to the atmosphere, a deaerating tank for holding condensate under vacuum to free it of dissolved and entrained gases, the top of said deaerating tank having a vent to the atmosphere, a check valve in said last-mentioned vent to prevent the entrance of air, a feed water pump for withdrawing condensate from the deaerating tank whereby a vacuum is created in the tank, connecting piping for refilling the deaerating tank from the lower portion of the accumulator tank, a spring seated valve in the connecting piping installed to close with the flow, a diaphragm unit responsive to water pressure for opening the spring seated valve, electrically operated means for creating said water pressure, a float switch actuated by the condensate at a predetermined level for setting in operation said water pressure creating means to actuate said diaphragm unit for refilling the deaerating tank after a predetermined quantity of condensate has been withdrawn from it, a float switch actuated by the condensate at a different level for stopping said means whereby to stop the refilling of the deaerating tank, and electric wiring for connecting said means and switches to a source of electric power.

12. Liquid deaerating apparatus comprising two tanks, the first tank being adapted to hold a liquid at atmospheric pressure and the second tank adapted to periodically hold portions of said liquid under vacuum for deaerating it of dissolved and entrained gases, the top of said second tank having a gas outlet provided with a check valve, a pump for withdrawing liquid from the second tank to create a vacuum in that tank, connecting piping for refilling the second tank from the first tank, a spring seated valve in said piping for stopping the flow of liquid therethrough, electrically operated water pressure creating means for opening said spring seated valve, and float switches actuated by changes in the level of said liquid for setting said means in operation to open said spring seated valve when said liquid reaches a predetermined low level and for stopping said means when the liquid reaches a predetermined high level.

CHARLES I. BAKER.